United States Patent
Freeman et al.

(10) Patent No.: US 10,230,939 B2
(45) Date of Patent: Mar. 12, 2019

(54) SYSTEM, METHOD AND SOFTWARE FOR PRODUCING LIVE VIDEO CONTAINING THREE-DIMENSIONAL IMAGES THAT APPEAR TO PROJECT FORWARD OF OR VERTICALLY ABOVE A DISPLAY

(71) Applicant: Maxx Media Group, LLC, Philadelphia, PA (US)

(72) Inventors: Richard S. Freeman, Philadelphia, PA (US); Scott A. Hollinger, Philadelphia, PA (US)

(73) Assignee: Maxx Media Group, LLC, Philadelphia, PA (US)

( * ) Notice: Subject to any disclaimer, the term of this patent is extended or adjusted under 35 U.S.C. 154(b) by 0 days.

(21) Appl. No.: 15/665,423

(22) Filed: Aug. 1, 2017

(65) Prior Publication Data
US 2018/0160098 A1  Jun. 7, 2018

Related U.S. Application Data

(63) Continuation-in-part of application No. 15/481,447, filed on Apr. 6, 2017.
(Continued)

(51) Int. Cl.
| | | |
|---|---|---|
| *H04N 13/00* | (2018.01) | |
| *H04N 13/189* | (2018.01) | |
| *H04N 13/156* | (2018.01) | |
| *H04N 13/282* | (2018.01) | |
| *H04N 13/296* | (2018.01) | |
| *H04N 13/239* | (2018.01) | |
| *H04N 13/106* | (2018.01) | |
| *H04N 21/81* | (2011.01) | |

(52) U.S. Cl.
CPC ......... *H04N 13/189* (2018.05); *H04N 13/106* (2018.05); *H04N 13/156* (2018.05); *H04N 13/239* (2018.05); *H04N 13/282* (2018.05); *H04N 13/296* (2018.05); *H04N 21/816* (2013.01)

(58) Field of Classification Search
USPC ....................................................... 345/419
See application file for complete search history.

(56) References Cited

U.S. PATENT DOCUMENTS

| | | |
|---|---|---|
| 3,723,904 A | 3/1973 | Bernier |
| 5,790,284 A | 8/1998 | Taniguchi et al. |

(Continued)

*Primary Examiner* — Kimbinh T Nguyen
(74) *Attorney, Agent, or Firm* — LaMorte & Associates, P.C.

(57) ABSTRACT

A system, method and software for producing 3D effects in a video of a physical scene. The 3D effects can be observed when the video is viewed, either during a live stream or later when viewing the recorded video. A reference plane is defined. The reference plane has peripheral boundaries. A live event is viewed with stereoscopic video cameras. The stereoscopic camera viewpoints are calculated that enable the event to be recorded within the peripheral boundaries of the reference plane. The footage from the stereoscopic video cameras is digitally altered prior to being imaged. The altering of the footage includes bending, tapering, stretching and/or tilting a portion of the footage in real time. Once the footage is altered, a common set of boundaries are set for superimposed footage to create a final video production.

20 Claims, 13 Drawing Sheets

Related U.S. Application Data

(60) Provisional application No. 62/319,788, filed on Apr. 8, 2016.

(56) References Cited

U.S. PATENT DOCUMENTS

| | | | |
|---|---|---|---|
| 6,121,972 A | 9/2000 | Takahashi et al. | |
| 6,614,427 B1 | 9/2003 | Aubrey | |
| 6,657,998 B2 | 12/2003 | Li | |
| 7,364,300 B2 | 4/2008 | Favalora et al. | |
| 7,589,759 B1 | 9/2009 | Freeman et al. | |
| 8,125,485 B2 | 2/2012 | Brown | |
| 2006/0079325 A1 | 4/2006 | Trajkovic | |
| 2006/0294465 A1 | 12/2006 | Ronen | |
| 2008/0079660 A1* | 4/2008 | Fukushima | H04N 13/275 345/7 |
| 2011/0063420 A1 | 3/2011 | Masuda | |
| 2011/0109720 A1* | 5/2011 | Smolic | H04N 13/0011 348/43 |
| 2012/0002014 A1* | 1/2012 | Walsh | G06T 19/006 348/47 |
| 2012/0086783 A1 | 4/2012 | Sareen | |
| 2012/0113106 A1 | 5/2012 | Choi | |
| 2012/0263372 A1 | 10/2012 | Adachi | |
| 2012/0314934 A1* | 12/2012 | Kudo | G06F 3/04845 382/154 |
| 2013/0184064 A1 | 7/2013 | Manning et al. | |
| 2013/0212501 A1 | 8/2013 | Anderson | |
| 2013/0278727 A1 | 10/2013 | Tamir et al. | |
| 2016/0086379 A1* | 3/2016 | Sadi | G06T 19/006 345/633 |
| 2016/0203634 A1* | 7/2016 | Vesely | G06F 3/012 345/419 |
| 2016/0344999 A1* | 11/2016 | Lajeunesse | H04N 5/23238 |
| 2017/0294052 A1 | 10/2017 | Freeman et al. | |

* cited by examiner

SYSTEM, METHOD AND SOFTWARE FOR PRODUCING LIVE VIDEO CONTAINING THREE-DIMENSIONAL IMAGES THAT APPEAR TO PROJECT FORWARD OF OR VERTICALLY ABOVE A DISPLAY

RELATED APPLICATIONS

This application is a continuation-in-part of U.S. patent application Ser. No. 15/481,447 filed Apr. 6, 2017 which claims the benefit of provisional patent application No. 62/319,788, flied Apr. 8, 2016.

BACKGROUND OF THE INVENTION

1. Field of the Invention

In general, the present invention relates to systems, methods, and software that are used to create a video production that is stereoscopic and/or auto-stereoscopic in nature and is intended for viewing on an electronic display. More particularly, the present invention relates to systems, methods and software that create video files that appear to be above or in front of the display screen showing the video file.

2. Prior Art Description

There are many recording systems that are designed to create stereoscopic or auto-stereoscopic video productions. The recorded video production is played on an electronic display screen with a two-dimensional viewing surface. Accordingly, the recorded video production is actually two-dimensional but appears to be three-dimensional when viewed on a standard display using 3D-glasses or when viewed on an auto-stereoscopic display without glasses.

Most prior art video production systems create three-dimensional images that appear to exist behind or below the plane of the display screen upon which the video production is shown. It is far more difficult to create three-dimensional images that appear to project vertically above, or in front of, the display screen on which it is viewed. To create a three-dimensional image that appears to be above or in front of a display screen, sophisticated adjustments have to be incorporated into the video production. Such adjustments often include complex adjustments to the positions and orientation angles of the stereoscopic cameras used in the creation of the video production. Prior art systems that modify the position and orientation angles of stereoscopic cameras are exemplified by U.S. Pat. No. 7,589,759 to Freeman, U.S. Patent Application Publication No. 2012/0263372 to Adachi and U.S. Patent Application No. 2011/0063420 to Masuda.

When 3D effects are added to a live scene. These 3D effects are traditionally added during post-production. That is, the scene is first recorded and the 3D effects are later added during the many of hours of scene editing and video post-production. 3D effects in video games and movies are commonly produced in such a manner. What is much more difficult to accomplish is the adding of 3D effects to a live video feed. This is especially true for effects that cause the 3D image to appear to be in front of or above the surface of a display screen. A live event can be imaged with stereoscopic cameras. This produces a standard 3D video file. However, using prior art techniques for traditional 3D production, the digital editing needed to make live elements appear to stand above or in front of a screen cannot be performed well on a streaming video feed without causing a significant lag delay in the video.

A need therefore exists in the art for a system, method and software that can be used to digitally manipulate a live video stream in real time to add specialized 3D effects that create video files that appear to project vertically above or in front of the display screen. In this manner, 3D effects can be added to events being recorded or viewed live. This need is met by the present invention as described and claimed below.

SUMMARY OF THE INVENTION

The present invention is a system, method and software for adding 3D effects to a video file that shows a real subject present within a physical scene. In accordance with the present invention, both a first video camera and a second video camera are positioned proximate the physical scene in a stereoscopic arrangement. The two video cameras can be part of the same camera boom assembly.

The first video camera and the second video camera are oriented and operated to obtain stereoscopic footage of the subject within the physical scene. The first video camera and the second video camera are both positioned to image the subject within peripheral boundaries of a common reference plane. The stereoscopic footage includes first video footage from the first video camera and second video footage from the second video camera.

The stereoscopic footage is altered to add 3D effects to the video footage that cause the subject to appear to extend above the common reference plane when viewed on a display screen. The first video footage and said second video footage are superimposed to create a superimposed video. A common set of boundaries are defined for the superimposed video. The superimposed video is cropped to the selected boundaries to create a final video file.

The final video file is played on an electronic device that plays the final video file as a video. As the video is viewed the subject appears to project vertically above, or in front of, the display screen.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention system, method and software can be embodied in many ways, only a few exemplary embodiments are described. In a first exemplary embodiment, the system, method and software are being used to stream the video of a live performance on a stage. In a second embodiment, the system, method and software are used to record a lecture of a teacher in a controlled environment. In either case, the live recording may be streamed live, or may be saved for later viewing on demand. These embodiments are selected for the purposes of description and explanation. The performer and teacher are intended to represent any object that can be imaged live and presented through the system. However, the illustrated embodiments are purely exemplary and should not be considered as limitations when interpreting the scope of the appended claims.

Figure 1:
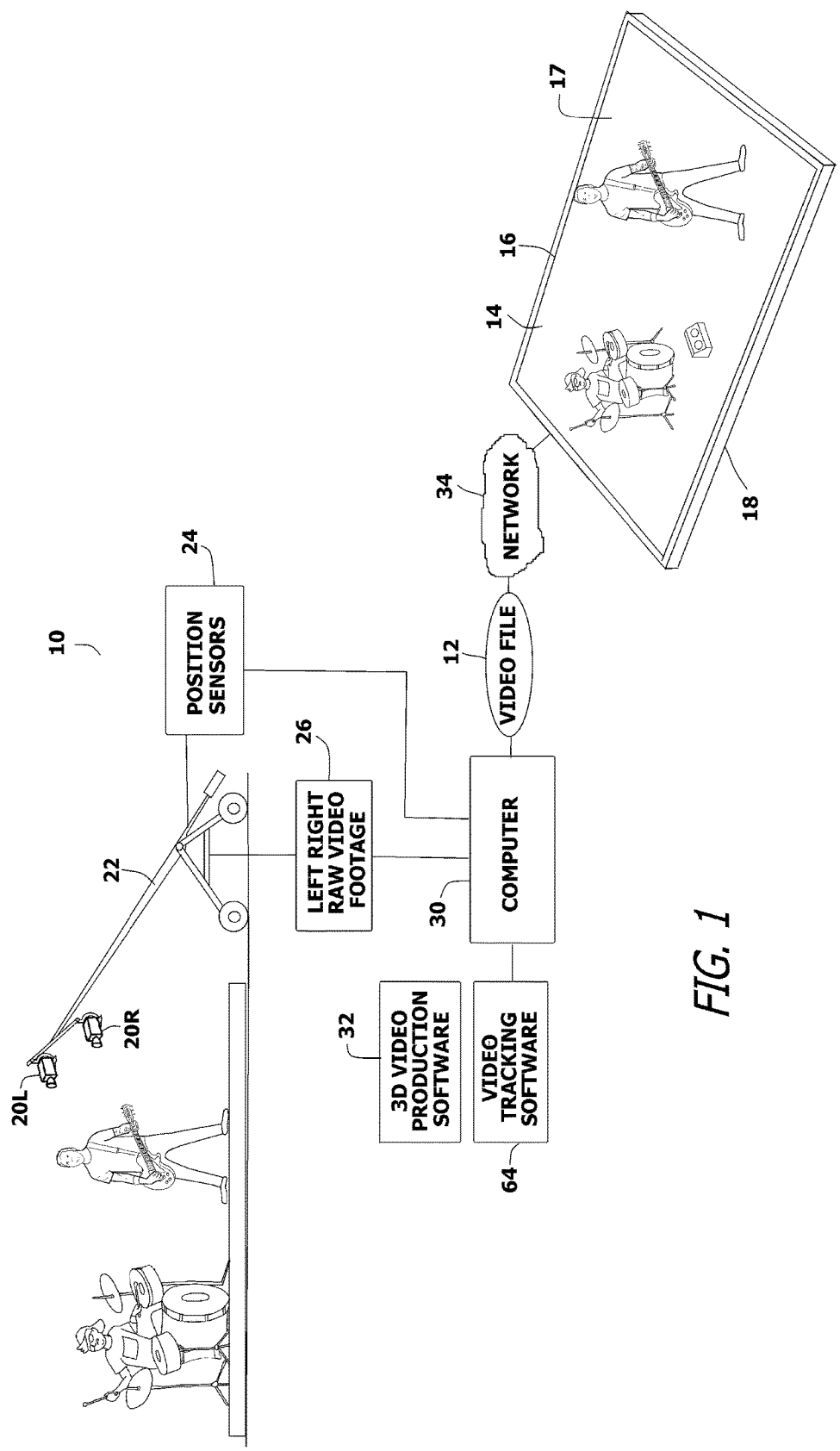
FIG. 1 shows the system components needed to create and utilize the present invention system, method, and software.

Referring to FIG. 1, it will be understood that the present invention system 10 is used to produce a video file 12 that produces a video 14 when played. The video 14 is intended to be viewed on a display screen 16. The display screen 16 can be an electronic display that is part of an electronic device 18. The display screen 16 has a screen surface 17.

If the video file 12 is being streamed live, it can be viewed directly from a network that carries the video stream. If the video file 12 is recorded and saved for later viewing, it can be recalled from any private or public video file source, such as Youtube®. In either scenario, the video file 12 produces a video 14 that appears to a person viewing the video 14 to have features that are three-dimensional. Furthermore, the viewed video 14 has elements that appear to the viewer to extend above, or in front of, the plane of the screen surface 17 of the display screen 16. If the display screen 16 is a traditional LED or LCD display, then the video 14 will have to be viewed with 3D glasses in order to observe the three-dimensional effects. If the display screen 16 is an auto-stereoscopic display, then the three-dimensional effects in the viewed video 14 can be observed with the naked eye.

Although the present invention system 10 can be used to create pre-recorded 3D video productions for later viewing on demand, the system is particularly well suited for streaming a live event or a pre-staged scene. The system 10 requires the use of stereoscopic cameras 20L, 20R at the live event so that the live event can be imaged in a stereoscopic manner. The stereoscopic cameras 20L, 20R include a left view camera 20L and a right view camera 20R. The stereoscopic cameras 20L, 20R can be fixed in place. However, since the event being imaged is a live event, it can be assumed that the matter being imaged is dynamic and will change in position and place over time. To make the video 14 more interesting to view, it is desirable to have the position of the stereoscopic cameras 20L, 20R change while recording. In this manner, the stereoscopic cameras 20L, 20R can move as a performer moves and the stereoscopic cameras 20L, 20R can be directed toward different elements of the performance during recording. Depending upon the sophistication of the production, it will be understood that multiple camera boom assemblies can be used to image an event. The description provided below presents a single camera boom assembly to simplify the needed description. If multiple camera boom assemblies or other stereoscopic camera rigs are used, it will be understood that the production steps explained below would be utilized on all the auxiliary footage collected. The images from different sets of stereoscopic cameras can be integrated to make a more interesting video production In the exemplary embodiment, the stereoscopic cameras 20L, 20R are mounted to a camera boom assembly 22. The stereoscopic cameras 20L, 20R are set a predetermined distance D1 apart. However, the angle, orientation, height and position of the stereoscopic cameras 20L, 20R can be selectively controlled using adjustable elements on the camera boom assembly 22. The adjustments of the camera boom assembly 22 can be computer controlled and/or manually controlled. Regardless, the camera boom assembly 22 contains sensors 24 that can electronically determine the exact position of the stereoscopic cameras 20L, 20R as the camera boom assembly 22 moves. For a given scene, certain parameters may be pre-set in the software system, which would maintain optimal camera positions relative to the scene being captured. Such camera positions can be determined by the producer or the 3D effects technician for the video production.

The stereoscopic cameras 20L, 20R record raw video footage 26 from a left camera perspective and a right camera perspective. This raw left/right camera footage 26 is fed to a computer 30. The computer 30 also receives the positional information of the camera boom assembly 22 from the sensors 24 on the camera boom assembly 22. Accordingly, the computer 30 has data corresponding to the raw left/right camera footage 26 and the position of the stereoscopic cameras 20L, 20R creating that footage 26.

The computer 30 runs 3D video production software 32 that will be later detailed. The 3D video production software 32 utilizes the data from the camera boom sensors 24 to integrate the left/right camera footage 26 into the video file 12. The creation of the video file 12 from the camera boom sensors 24 and the raw left/right camera footage 26 takes only a fraction of a second per image frame. Accordingly, a 3D video file 12 can be created and streamed from a live performance with little or no discernable processing delay.

The 3D video file 12 can be accessed by viewers over any data communication network 34. The 3D video file 12 is accessed using any electronic device 18 that can accept data over the data communication network 34. When the 3D video file 12 is played as a video 14 on the display screen 16, elements within the video 14 appear to project forward or above the surface 17 of the display screen 16, depending upon the orientation of the display screen 16.

Figure 2:
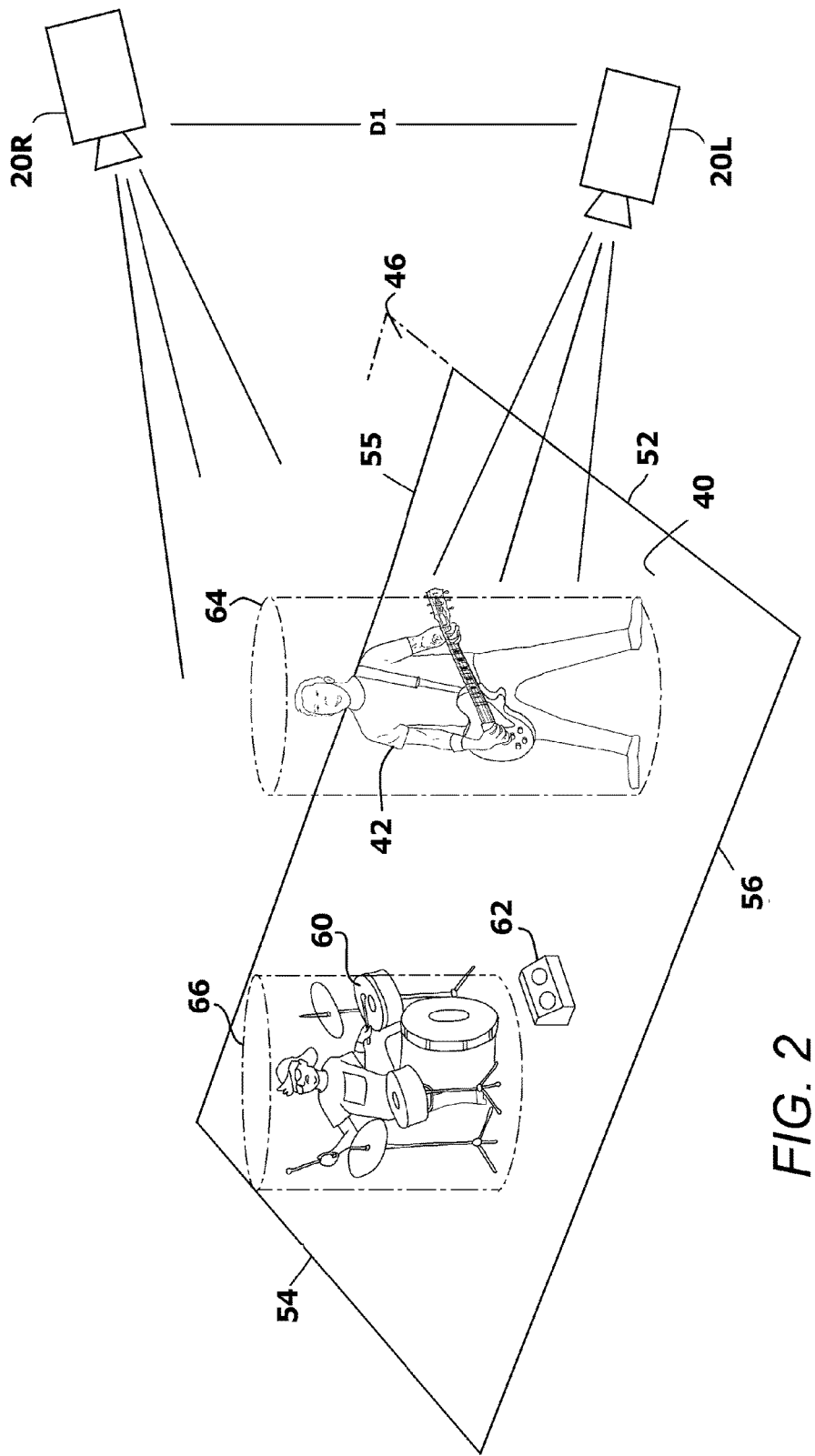
FIG. 2 is a perspective view of an exemplary embodiment of a video scene being recorded with stereoscopic video cameras.
Figure 3:
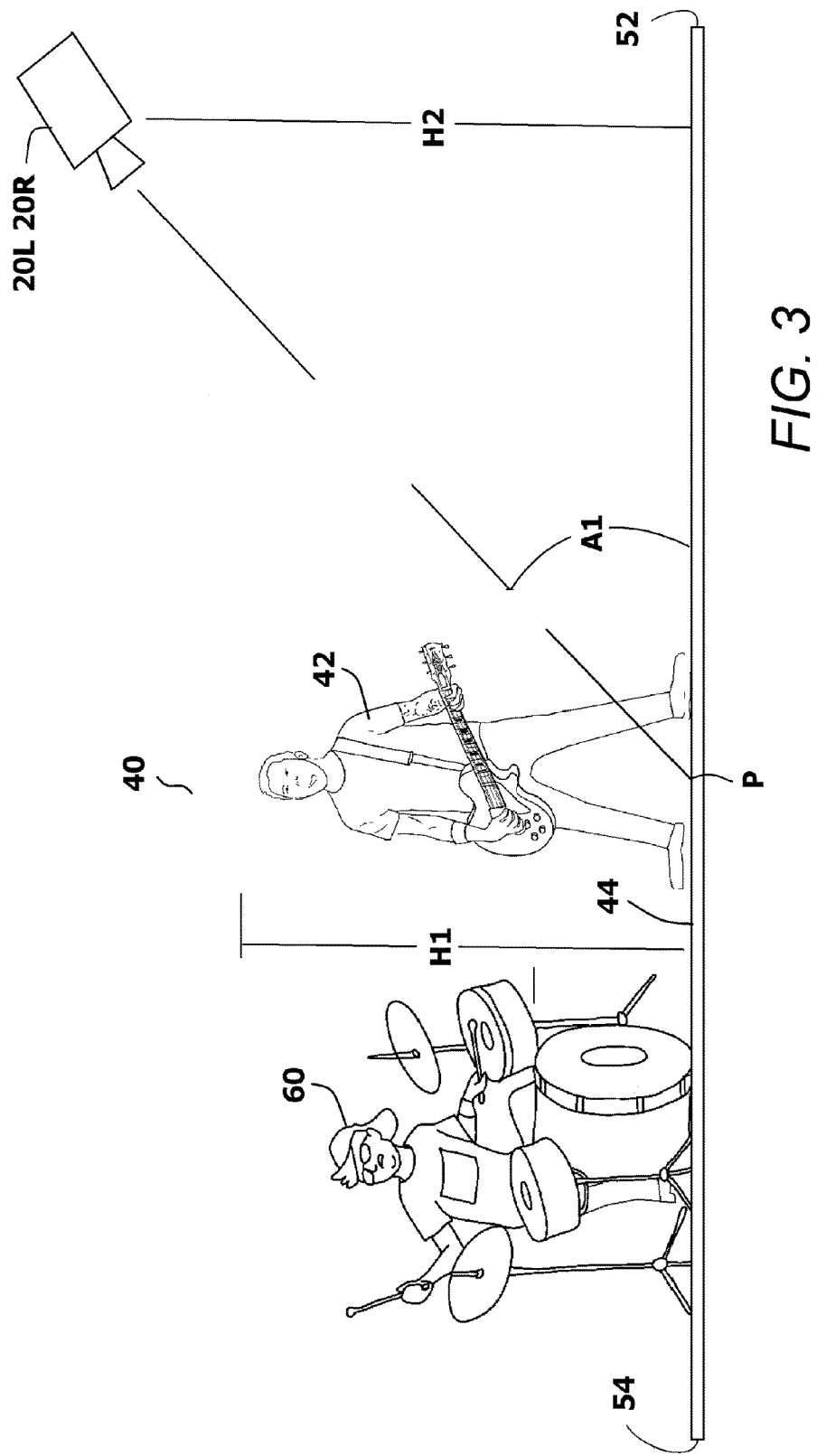
FIG. 3 is a side view of the video scene of FIG. 2.

Referring to FIG. 2 and FIG. 3 in conjunction with FIG. 1, a video scene 40 is shown being created using the 3D video production software 32. The video scene 40 contains a principal subject 42 toward which the stereoscopic cameras 20L, 20R are directed. In the shown example, the principal subject 42 is an entertainer being recorded while performing on a stage 44. However, it will be understood that any subject can be the focus of the stereoscopic cameras 20L, 20R. Since the video file 12 being produced has 3D effects, a reference plane 46 is first established using the 3D video production software 32. A reference plane 46 is needed because the 3D effects are designed to appear to ascend above the reference plane 46 or descend below the reference plane 46. The reference plane 46 can be arbitrarily selected by a video producer or 3D effects technician on scene. Likewise, the reference plane can be selectively altered during production to accommodate different camera shots or to vary the desired 3D effect. The reference plane 46 can be any plane in the scene imaged by the stereoscopic cameras 20L, 20R. In the shown exemplary embodiment, the reference plane 46 is oriented with the floor of the stage 44 upon which the entertainer stands. Electing the floor as the reference plane would be common for imaging people and items in a room or on a stage.

When the video file 12 is played on an electronic device 18 as a video 14, the 3D video production software 32 orients the reference plane 46 to coincide with the plane of the surface 17 of the display screen 16. As such, when the video 14 is viewed, any object imaged above the reference plane 46 will project forward and appear to extend out in front of, or above, the surface 17 of the display screen 16, depending on the orientation of the display screen 16. Conversely, any object imaged below the reference plane 46 will appear to be rearwardly projected and will appear below or behind the plane of the surface 17 of the display screen 16 as the video 14 is viewed.

During the event being imaged, raw stereoscopic footage 26 is taken of a physical scene. In the present example, the physical scene is the principal subject 42 and the area of the stage 44 surrounding the principal subject 42. The stereoscopic footage 26 is taken from the left viewpoint camera 20L and the right viewpoint camera 20R. The limits of the physical scene being recorded are dependent upon the distance D1 between the stereoscopic cameras 20L, 20R and the setting of the camera boom assembly 22. Most display screens 16 are rectangular in shape, having a width that is between 50% and 80% of the length. Accordingly, the stereoscopic footage 26 is cropped to create selected boundaries within the reference plane 46. This makes the footage appropriate in size and scale to be shown on a typical display screen 16. The cropped boundaries include a front boundary 52, a rear boundary 54, and two side boundaries 55, 56. When the video file 12 is produced, only elements imaged within the cropped boundaries 52, 54, 55, 56 will be seen.

The principal subject 42, i.e. the performer on the stage, has a height H1. The stereoscopic cameras 20L, 20R are set to a second height H2. The second height H2 is a function of the subject height H1 and the rear image boundary 54. The second height H2 of the stereoscopic cameras 20L, 20R must be high enough so that the top of the principal subject 42, as viewed from the stereoscopic cameras 20L, 20R, does not extend above the rear image boundary 28. The elevation angle of the stereoscopic cameras 20L, 20R and the convergence angle of the stereoscopic cameras 20L, 20R have a direct pythagorean relationship that depends upon the selected cropped boundaries 52, 54, 55, 56 and height H1 of the principal subject 42.

Depending upon the 3D effect being created, the stereoscopic cameras 20L, 20R are oriented so that their focal points are on the reference plane 46 and/or their lines of sight intersect at the reference plane 46. That is, the two stereoscopic cameras 20L, 20R achieve zero parallax at the reference plane 46. The convergence point P is preferably selected to correspond to a point near the bottom and rear of the principal subject 42, should the principal subject 42 be standing on the surface that corresponds to the reference plane 46. For example, in the shown embodiment, the reference plane 46 corresponds to the stage 44. The stereoscopic cameras 20L, 20R are directed to a point on the stage just below the rear of the principal subject 42. The angles of the stereoscopic cameras 20L, 20R change each time the camera boom assembly 22 is adjusted.

As the raw stereoscopic camera footage 26 is received and digitally cropped into selected boundary limits, the footage 26 is further digitally processed to create 3D effects in the video file 12. In the raw stereoscopic camera footage 26 there will be at least one principal subject 42. There is also likely at least one secondary subject 60 and background subjects 62. Principal objects 42 are preferably the tallest objects in the video scene 40 that move relative the stereoscopic cameras 20L, 20R and are good candidates for sharp 3D effects. Secondary objects 60 are objects in the video scene 40 that are less tall and/or do not move significantly. Lastly, there are the background subjects 62 which consist of inanimate objects that do not dominate any portion of the video scene 40.

The principal subjects 42, secondary subjects 60 and background subjects 62 are identified in the video scene 40. The selected principal subjects 42 depend upon the live scene being imaged. If the live scene is a performance on a stage, then the principal subjects 42 would most likely be the performers on the stage. The positions of the principal subjects 42 are tracked. If the principal subjects 42 are people, they can be tracked in real time using existing facial/head tracking software 64. Several head-tracking software programs are commercially available including the Visage/SDK software of Visage Technologies of Linkoping, Sweden. The video producer, 3D effects technician or controlling software that is operating the camera boom assembly 22 and/or viewing the raw footage can then select different performers as being the principal subjects 42 and secondary subjects 60. The principal subjects 42 would be the performers who stand out front and move the most. The secondary subjects 60 would be performers, such as a keyboard player or drummer, who stays in one place and mostly moves only his/her hands. The background subjects 62 would be the stationary objects on the stage 44. The position of the secondary subjects 60 and the background subjects 62 are assumed to be stationary and are positionally logged within the selected boundaries 52, 54, 55, 56 of the video scene.

The 3D video production software 32 digitally alters the appearance of the principal subjects 42, the secondary subjects 60 and the background subjects 62 in real-time, provided it is desired to have the principal subjects 42, secondary subjects 60 and background subjects 62 appear three-dimensional in the video file 12. The highest level of 3D effects are desired for the principal subjects 42. Although the same 3D effects can be used for all subjects, a lesser level of 3D effects may be the secondary subjects 60 since they are less prominent in the scene. Lastly, general 3D effects can be created for the background subjects 62. This limits the needed processing time and enables imaging processing to be performed in near real time.

As the principal subjects 42 are tracked, a first effects zone 64 is identified around the principal subject 42. All image data that corresponds to the first effects zone 64 is digitally altered in the same manner. Likewise, as secondary subjects 60 are logged and identified, secondary effects zones 66 are created around the secondary objects 60. All image data that corresponds to the secondary effects zone 66 is digitally altered in the same manner. Lastly, all remaining areas are deemed to be background subjects 62 and are digitally processed in the same manner. If effect zones overlap, the processing of a first effect zone 64 has processing preference over a second effect zone 66. Both the first effect zone 64 and the second effect zone 66 have preference over the remaining background. The entire scene can be selected as a single zone. However, for large or complex scenes, the creation of smaller zones significantly increases image processing efficiency.

Figure 4:
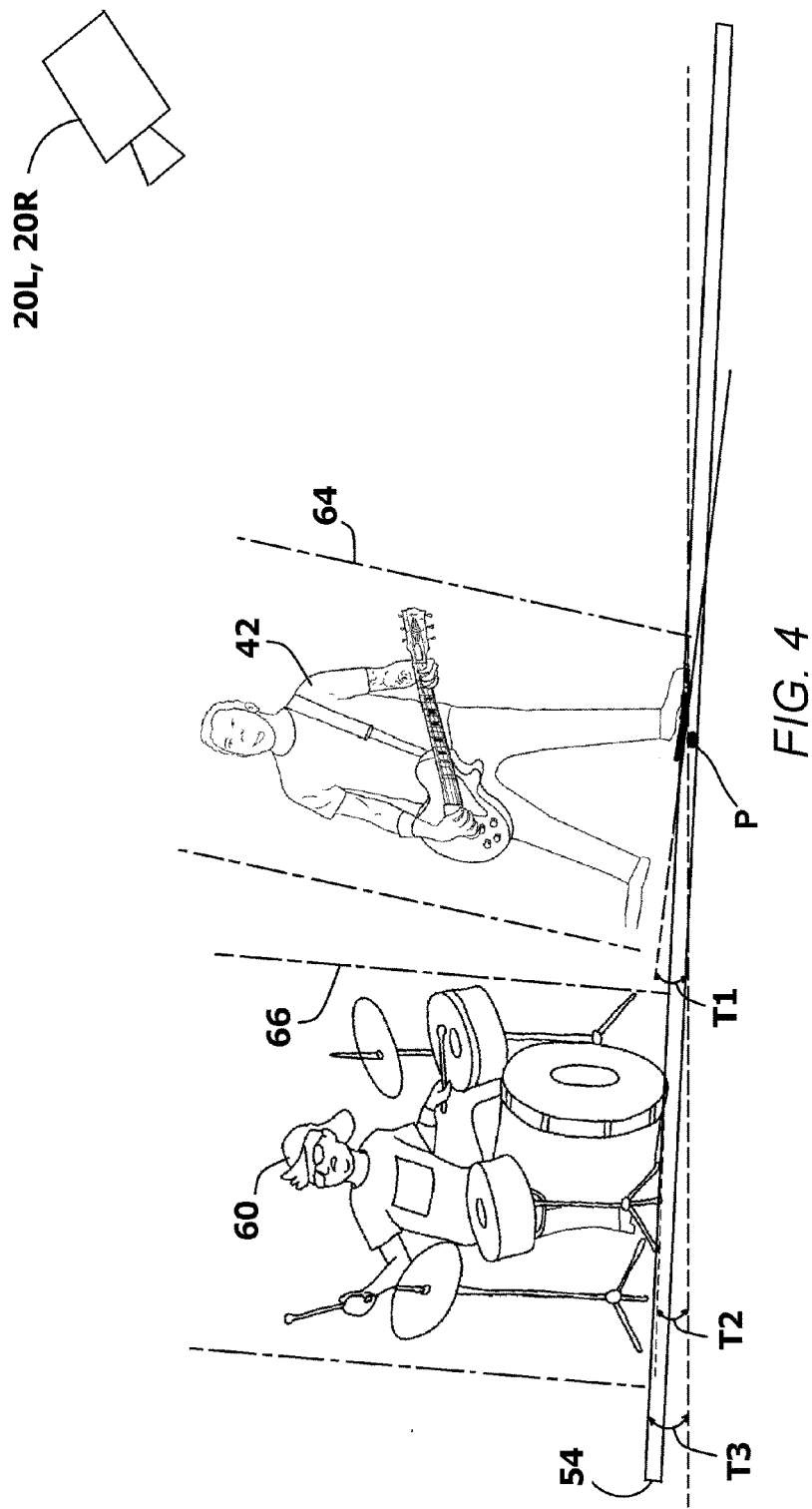
FIG. 4 is a side view showing tilt digital modifications made to the footage of the video scene shown in FIG. 3.

The principal objects 42 in the first effect zones 64, the secondary objects 60 in the second effects zones 66 and the background objects 62 in the remaining zones are all subject to 3D effects in the form of digital skewing. However, each of the effect zones is skewed to different skew angles. Referring to FIG. 4 in accordance with FIG. 1 and FIG. 2, it can be seen that the first effect zone 64 surrounding the principal subject 42 is identified in the raw footage 26. The image data from the first effect zone 64 is then digitally skewed to appear to tilt toward the stereoscopic cameras 20L, 20B. The preferred tilt angle T1 is generally between 1 degree and 20 degrees from the horizontal, depending upon the final perceived height of the principal subject 42.

The secondary objects 60 in the second effect zones 66 can likewise be skewed. However, the tilt angle T2 of the secondary effect zone 66 is less than or equal to that of the first effect zone 64. Since the digital effect is only a skewing of image data in selected areas, the skewing can be accomplished using a simple digital filter. This enables the skewing effects to be created in real time.

The raw video footage 26 is further digitally altered by skewing the reference plane 46 so that the background areas appear tilted out of its original plane. The 3D video production software 32 can alter the raw footage 26 to create the appearance of a tilt the reference plane 46 either toward or away from the stereoscopic cameras 20L, 20R at a tilt angle T3. The preferred tilt angle T3 is generally between 1 degree and 20 degrees from the horizontal, depending upon the height of the camera boom assembly 22 and the final perceived height of the principal subjects 42. Using the camera viewpoint conversion point P under the principal subject 42 as a fulcrum point, the reference plane 46 can be digitally manipulated to tilt forward or backward. The tilt angle T3 of the reference plane 46 is independent of the tilt angle T1 of the principal object 20 and the tilt angle T2 of the secondary subjects 60. The tilting of the reference plane 46 changes the position of the rear image boundary 54 relative to the perceived position of the principal subject 42. This enables the height of the principal subject 42 to be increased proportionately within the confines of the video scene 40.

Figure 5:
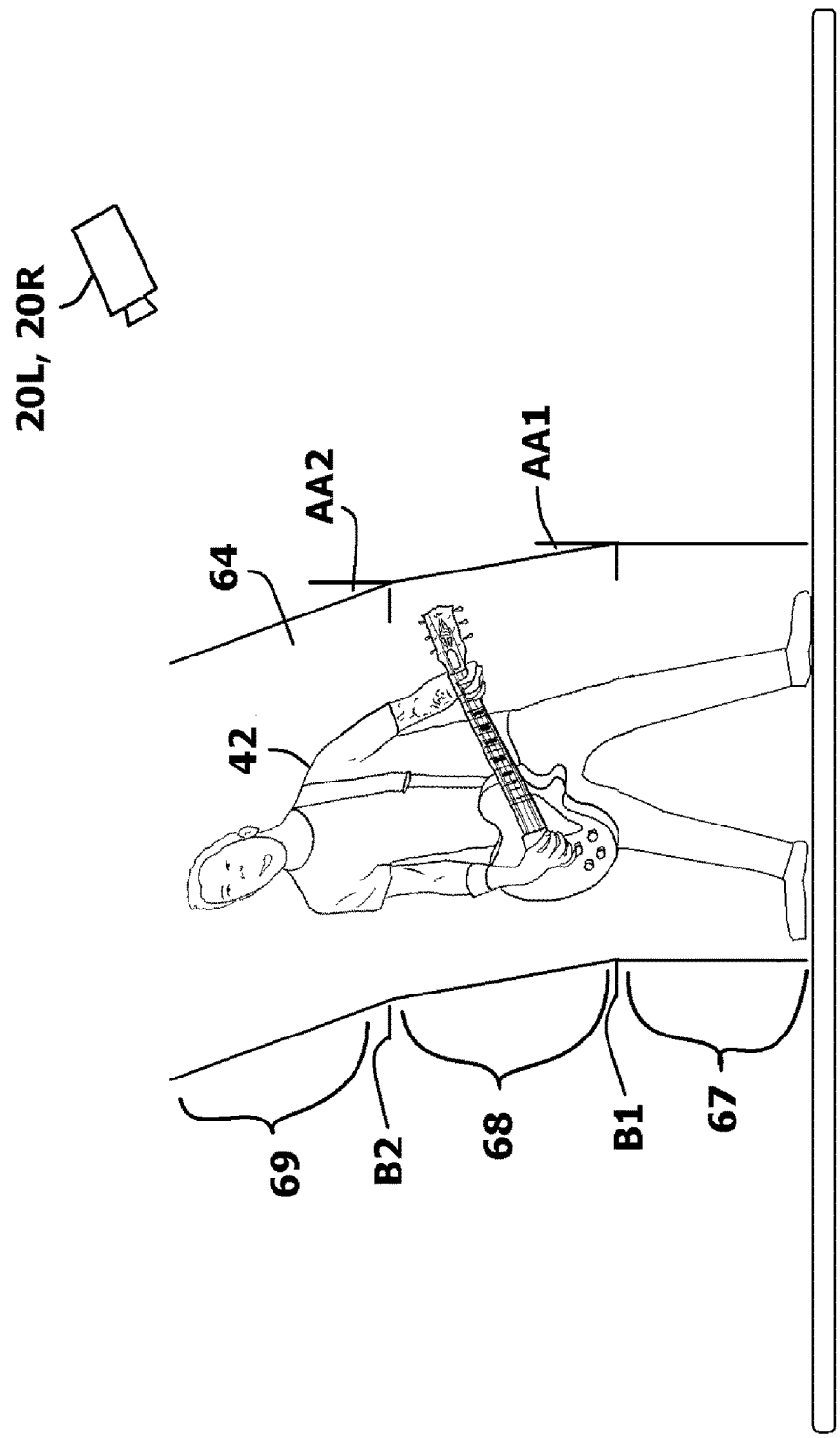
FIG. 5 is a side view showing bend digital modifications made to the footage of the video scene.

In addition to the skew manipulations expressed in the description of FIG. 4, the 3D video production software 32 creates further 3D effects by creating selected bends in the first effect zone 64. Referring to FIG. 5, a preferred bend manipulation is shown. In FIG. 5, the principal subject 42 in its first effect zone 54 is shown. In reality, the principal subject 42 stands at height H1 above the reference plane 46, i.e. the stage 44. At a first height, which is approximately one-third the full height H1 of the subject 42, a first bend plane B1 is selected. Likewise, at a second height, which is approximately two-thirds the full height H1 of the subject 42, a second bend plane B2 is selected. This divides the principal subject into three regions 67, 68, 69 along its height. In the first region 67, the raw footage of the first effect zone 67 is not manipulated. In the second region 68, a slight digital manipulation occurs. Any portion of the first effect zone 64 above the first bend plane B1 and within the second region 68 is digitally tilted by a first angle AA1. In the third region 69, the first effect zone 64 is tilted at a second angle AA2, which is steeper than the first angle AA1. The first angle AA1 and the second angle AA2 are measured in relation to an imaginary vertical plane that is parallel to the vertical plane in which the stereoscopic cameras 20L, 20R are set. As a result of the digital bending of the primary effect zone 64, the video scene 40 can be made larger and taller without extending above the rear image boundary 54 as viewed from the stereoscopic cameras 20L, 20R. Accordingly, after digital manipulation of the first effect zone 64, the principal subject 42 appears taller and has a more pronounced forward or vertical projection as viewed from the perspectives of the stereoscopic cameras 20L, 20R.

Figure 6:
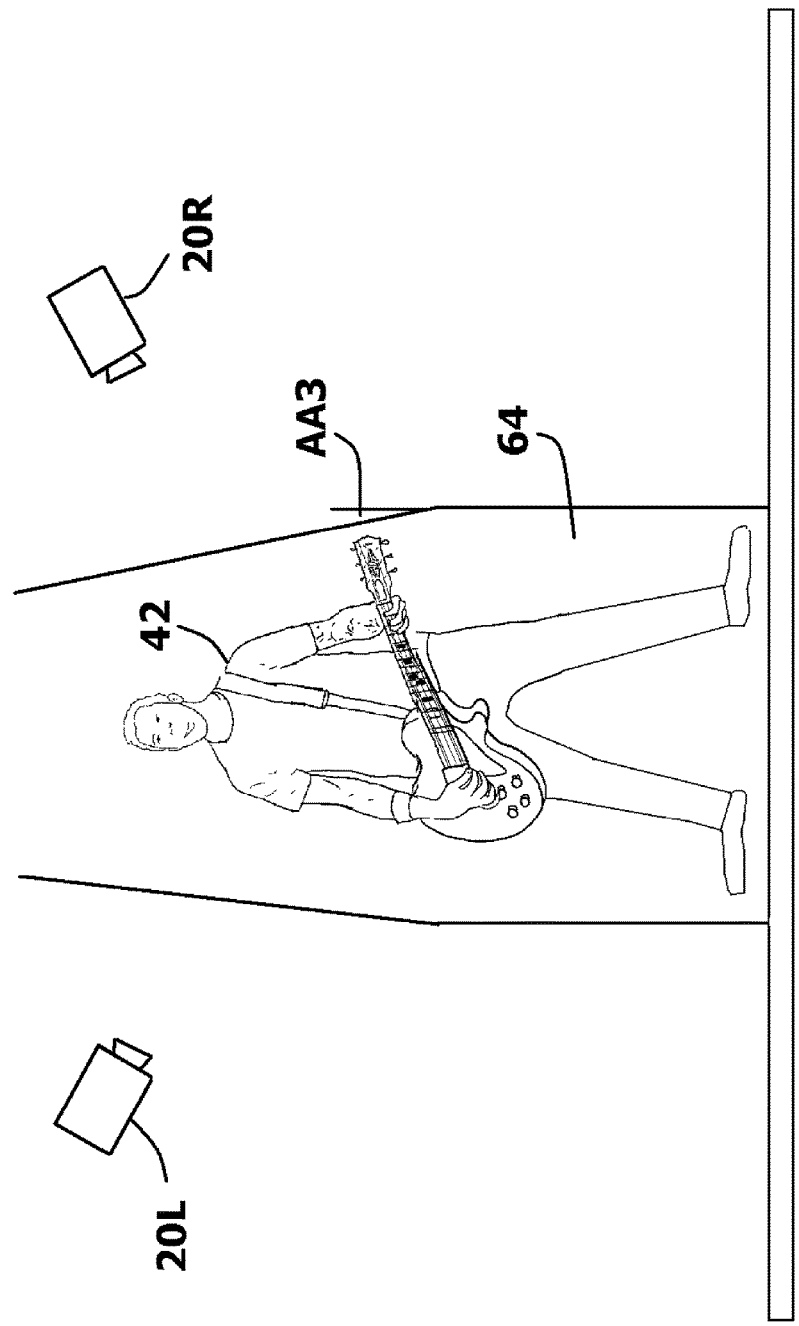
FIG. 6 is a front view showing taper digital modifications made to the footage of the video scene.

Referring to FIG. 6 in conjunction with FIG. 2, a preferred digital taper manipulation is explained. Again, the first effect zone 64 surrounding the principal subject 42 is shown. The first effect zone 64 is divided into two regions 70, 72 along its height. In the first region 70, the image data for the principal subject 42 is not manipulated. In the second region 72, the image data for the principal subject 42 is reduced in size using a taper from front to back or side to side. The selected taper has an angle AA3 of between 1 degree and 25 degrees. The point where the taper begins is positioned between ⅓ and ⅔ up the height of the principal subject 42. The result is that the video scene 40 can be made wider without extending beyond the side image boundaries 55, 56. When viewed, the principal subject 42 appears taller and has a more pronounced forward or vertical projection.

Figure 7:
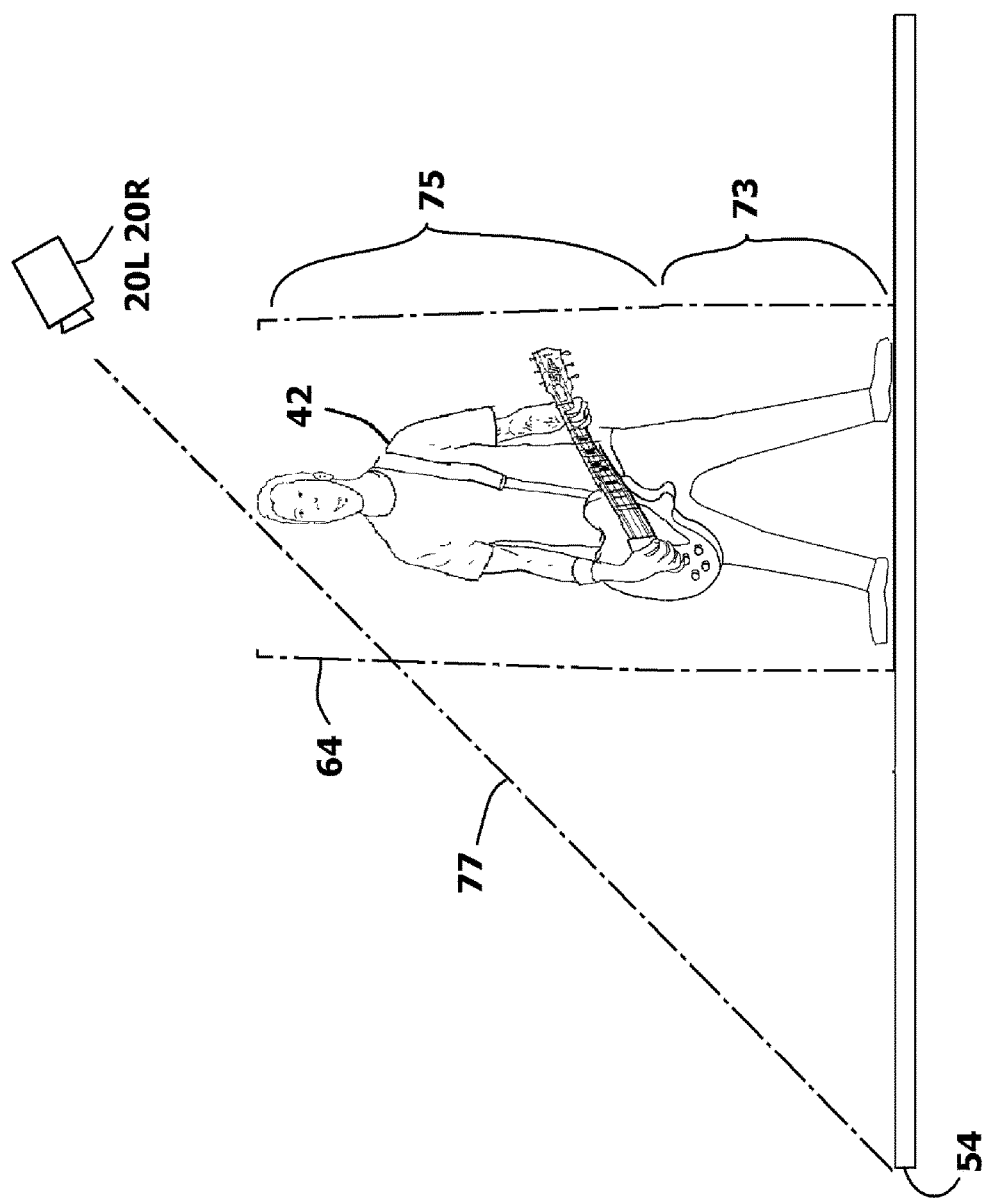
FIG. 7 is a front view showing stretching modifications made to the footage of the video scene.

Referring to FIG. 7 in conjunction with FIG. 2, a preferred digital stretch manipulation is explained. Again, the first effect zone 64 surrounding the principal subject 42 is shown. The first effect zone 64 is divided into two regions 73, 75 along its height. In the first region 73, the image data for the principal subject 42 is not manipulated. In the second region 75, the image data for the principal subject 42 is increased in its vertical length, that is stretched in length. The increase in vertical length depends upon the position of the stereoscopic cameras 20L 20R and can result in a vertical stretching of between one percent and twenty percent. The stereoscopic cameras 20L, 20R are positioned at a first height. An imaginary hypotenuse line 77 extends from the stereoscopic cameras 20L 20R to the rear boundary 54 of the scene. The image data in the second region 75 is increased vertically until the top of the principal subject 42 is at, or close to, the hypotenuse line 77. The result is that elements within the video scene 40 can be made taller without extending beyond the rear image boundaries 54. When viewed, the principal subject 42 appears taller and has a more pronounced forward or vertical projection.

The raw video footage 26 contains images from the left viewpoint camera 20L and the right viewpoint camera 20R. The above described digital manipulations of the camera footage 26 can be performed separately on the left and right footage prior to the footage being superimposed. Alternatively, the left/right footage can be superimposed and then digitally manipulated in the manners described. Regardless, referring to FIG. 8 and FIG. 9 in conjunction with FIG. 2, it can be seen that there are two steams of video footage 26L, 26R. The video footage 26L, 26R is stereoscopic, with one being the left camera video footage 26L (FIG. 8) and one being the right camera video footage 26R (FIG. 9). Each stream of the stereoscopic video footage 26 has a look-down perspective due to the angle of the camera viewpoints. This causes the perspective to be to appear to be generally trapezoidal in shape with a front boundary 52 that appears wider than the rear boundary 54.

Figure 8:
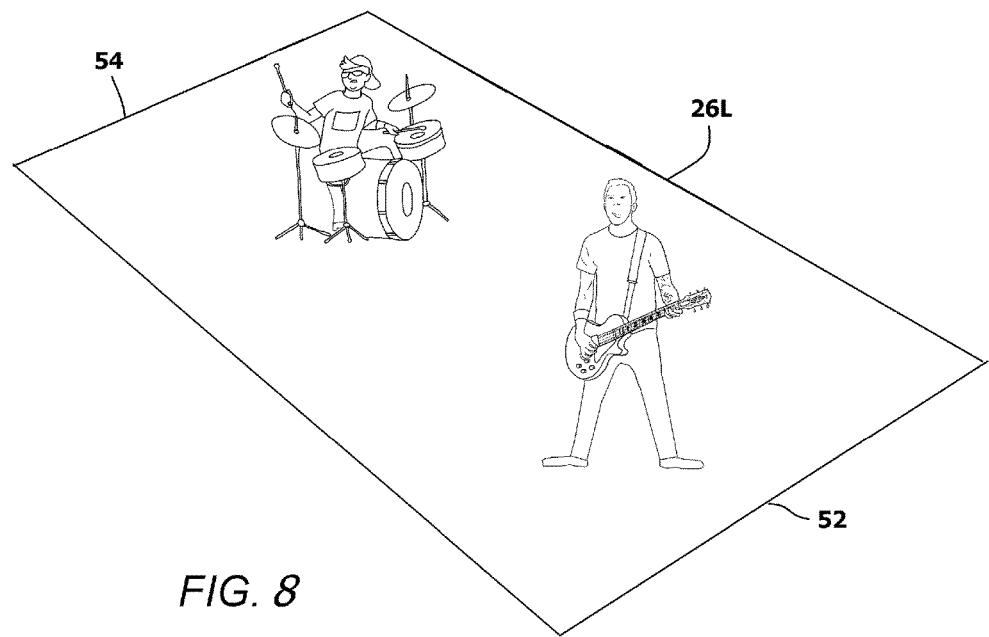
FIG. 8 and FIG. 9 show left and right stereoscopic images, respectively, of the footage of the video scene.
Figure 9:
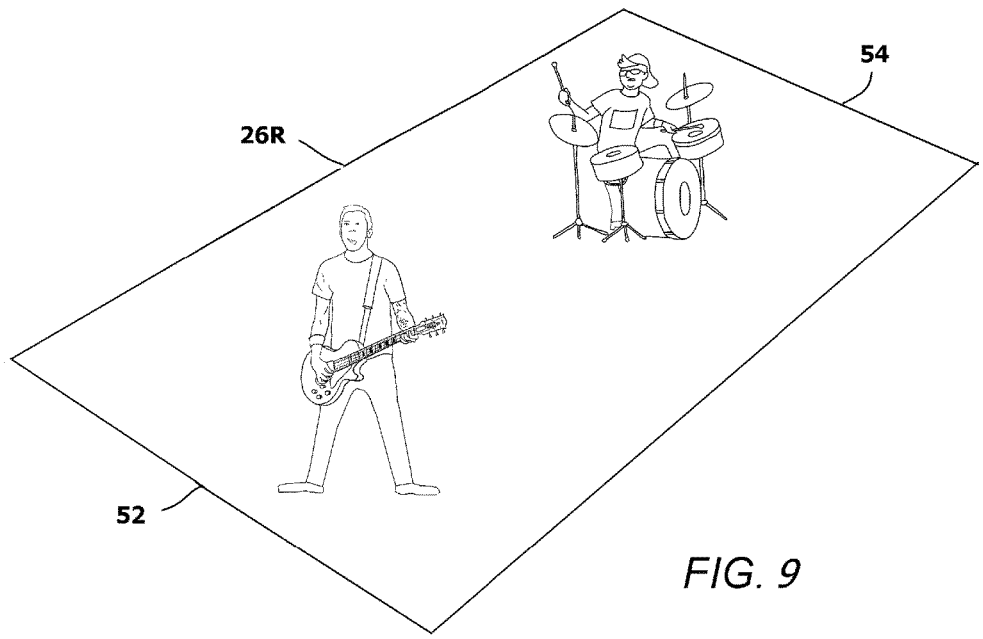
Figure 10:
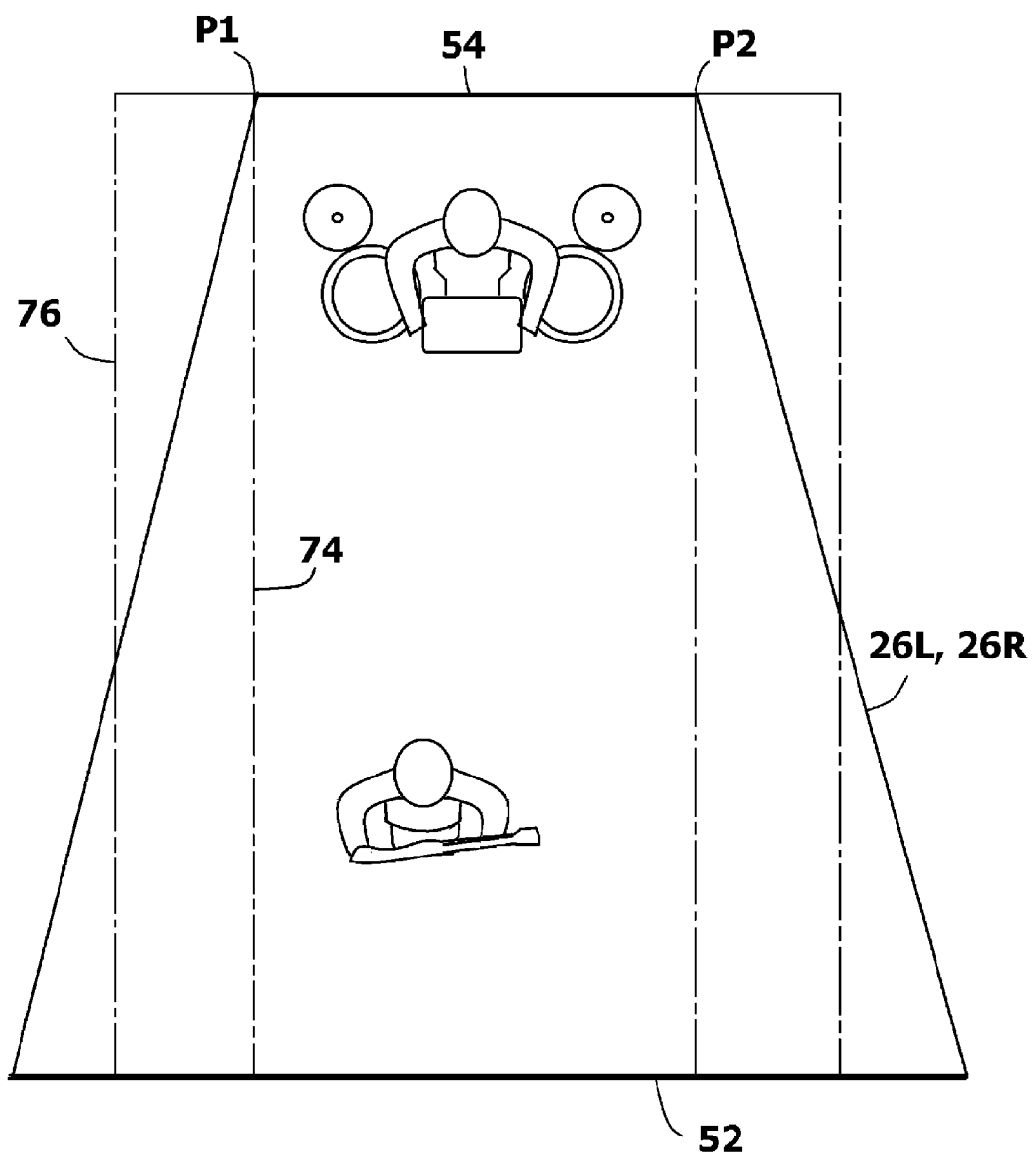
FIG. 10 is a top view of the stereoscopic images showing the superimposition of guidelines to the footage of the video scene.

Referring to FIG. 10, a top view of one of the stereoscopic video footage 26L, 26R from FIG. 8 or FIG. 9 is shown. Although only one of the footages is shown, it will be understood that the described process is performed on both of the stereoscopic footages 26L, 26R. Thus, the reference numbers 26L, 26R of both stereoscopic video footages 26L, 26R are used to indicate that the processes affect both.

Referring to FIG. 10 in conjunction with FIG. 1, it can be seen that temporary reference guides are superimposed upon the stereoscopic video footages 26L, 26R. The reference guides include a set of inner guidelines 74 and a set of outer guidelines 76. The inner guidelines 74 are parallel lines that extend from the rear boundary 54 to the front boundary 52. The inner guidelines 74 begin at points P2 where in stereoscopic video footages 26L, 26R met the rear boundary 54. The outer guidelines 76 are also parallel lines that extend from the rear boundary 54 to the front boundary 52. The position of the outer guidelines 76 depends upon the dimensions of the display screen 16 upon which the video file 12 is to be displayed. The width between the outer guidelines 46 corresponds to the pixel width of the display screen to be used.

Figure 11:
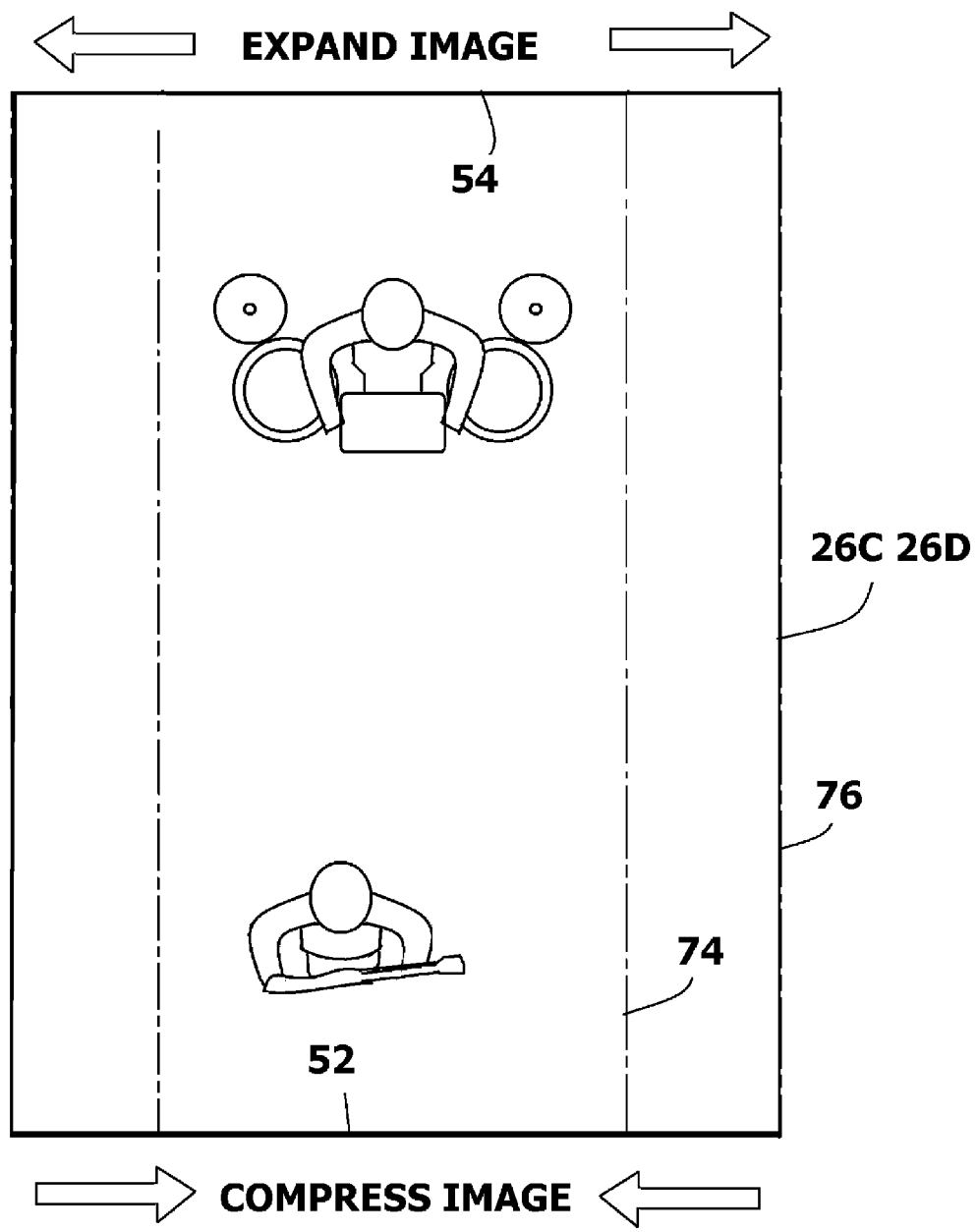
FIG. 11 shows a digitally corrected stereoscopic image created using the guidelines previously shown in FIG. 9.

Referring to FIG. 11 in conjunction with FIG. 10 and FIG. 1, it can be seen that the stereoscopic video footages 26L, 26R are digitally altered to fit within the parameters of the outer guidelines 76. As such, the stereoscopic images 40, 42 are widened toward the rear boundary 54 and compressed toward the front boundary 54. This creates corrected stereoscopic video footages 26C, 26D. The inner guidelines 44 remain on the corrected stereoscopic video footages 26C, 26D.

Figure 12:
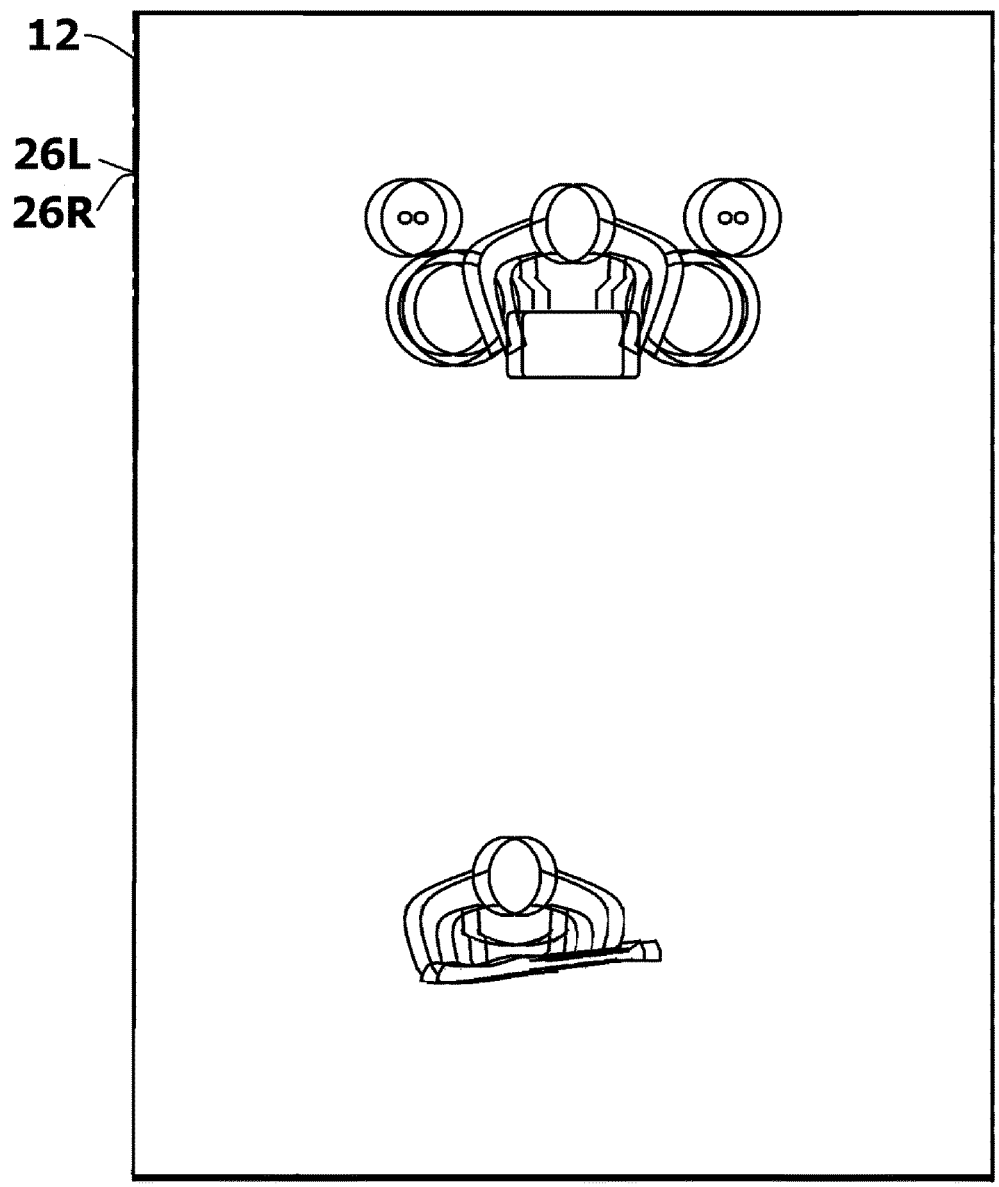
FIG. 12 shows a final image with left and right stereoscopic footage superimposed.

Referring to FIG. 12, in conjunction with FIG. 11 and FIG. 1, the corrected left and right stereoscopic video footages 26C, 26D are superimposed. The inner guidelines 74 from both corrected stereoscopic video footages 26C, 26D are aligned. Once alignment is achieved, the inner guidelines 74 are removed. This creates a final video file 12. Depending upon how the final video file 12 is to be viewed, the corrected stereoscopic video footages 26C, 26D can be colored in red or blue, or the corrected stereoscopic video footages 26C, 26D can be oppositely polarized. In this manner, when the video 14 produced by the final video file 12 is viewed using 3D glasses on a standard display or with no glasses on an auto-stereoscopic display, the video 14 will contain elements that appear to be three-dimensional.

Figure 13:
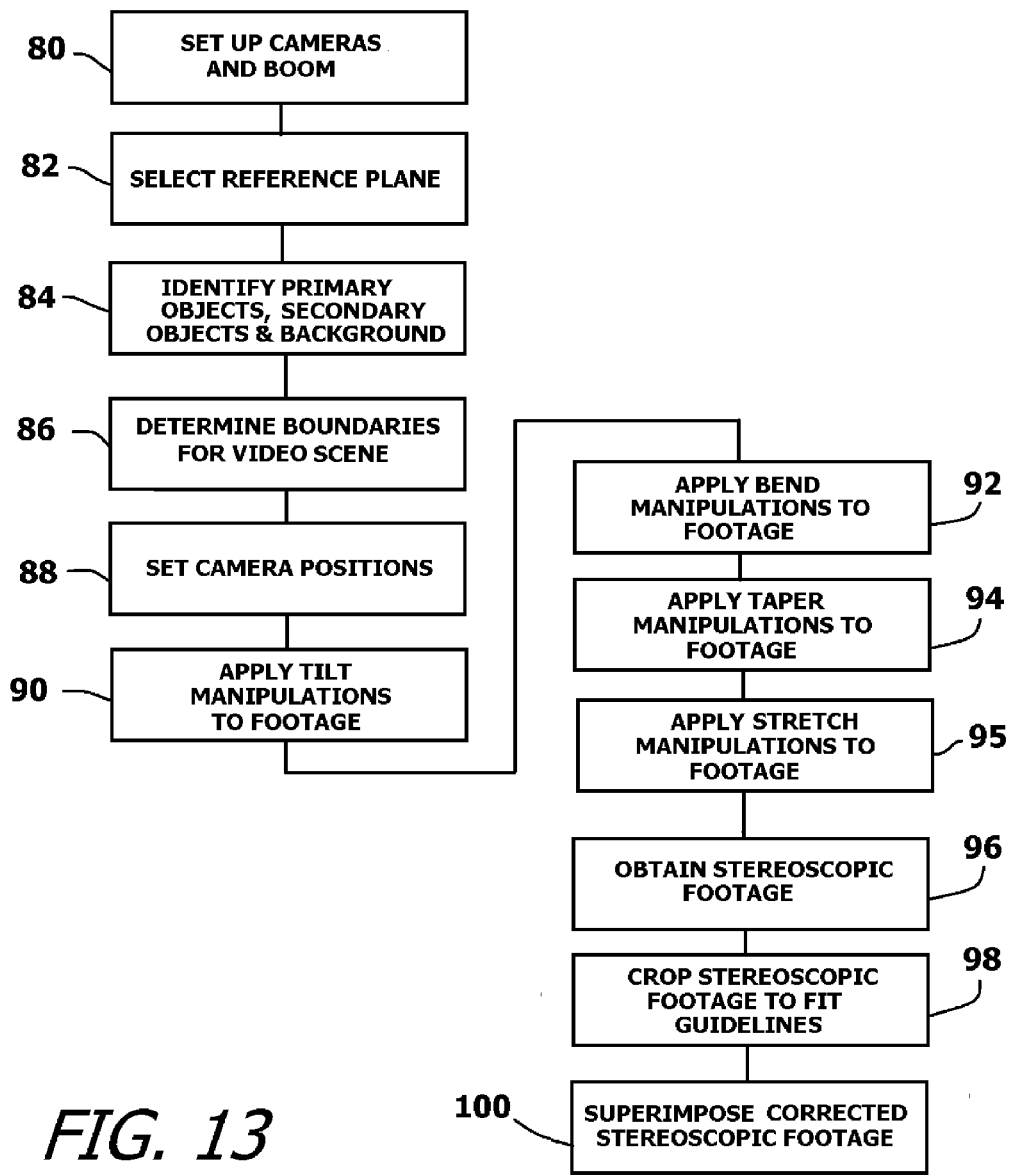
FIG. 13 shows a block diagram logic flow for the software methodology utilized by the present invention.

Referring to FIG. 13 in view of all earlier figures, the software methodology for the overall system can now be summarized. As is indicated in Block 80, a video producer and/or 3D effects technician sets up the camera boom assembly 22 and calibrates the camera boom assembly 22 and the stereoscopic cameras 20L, 20R for the physical scene to be video recorded. The video producer and/or 3D effects technician also selects a reference plane 46 within the physical scene. See Block 82. The video producer and/or 3D effects technician then selects objects in the view of the stereoscopic cameras 20L, 20R that will be identified in production as primary subjects 42, secondary subjects 60 and background subjects 62. See Block 84. Using the reference plane 46 and the selected subjects, the video producer and/or 3D effects technician can determine the boundaries for the video scene 40 being produced. See Block 86.

Knowing the boundaries of the video scene 40 and the reference plane 46, the video producer sets the angle and height of stereoscopic cameras 20L, 20R. The camera viewpoints are set so that the line of sight for the stereoscopic cameras 20L, 20R achieve zero parallax at the reference plane 46. See Block 88. Also see prior description of FIG. 3.

As is indicated by Blocks 90, 92, 94, and 95 the raw footage 26 is digitally altered using tilt manipulations, bend manipulations, taper manipulations and stretch manipulations. Different manipulations and degrees of manipulations are performed on the areas surrounding primary subjects 42, secondary subjects 60 and the remaining background. See prior description of FIG. 4, FIG. 5, FIG. 6 and FIG. 7. Two stereoscopic video footages 26L, 26R are then obtained for the video scene 40. See Block 96. Also see prior description of FIG. 8 and FIG. 9. The stereoscopic video footages 26L, 26R are then cropped and corrected to fit the boarder guidelines of the video scene 40. See Block 98. Also see prior description of FIG. 10 and FIG. 11. Lastly, the corrected stereoscopic video footages 26L, 26R are superimposed. See Block 100. Also see prior description of FIG. 12. The result is a final video file 14 that will appear to extend above, or in front of, the surface 17 of the display screen 16 when viewed by a user.

In the illustrated first embodiment, a performer is shown on stage. The performance is shown with 3D effects on an electronic device. Alternatively, it will be under stood that the performer on a stage could be a team on a field or any other dynamic live event. It should also be understood that the present invention system, method and software can be used in controlled studio settings where camera positions are preset. This is useful for showing a teacher in a classroom, a dealer in a casino, a representative at a customer service desk or the like. Such a scenario is shown in FIG. 14.

Figure 14:
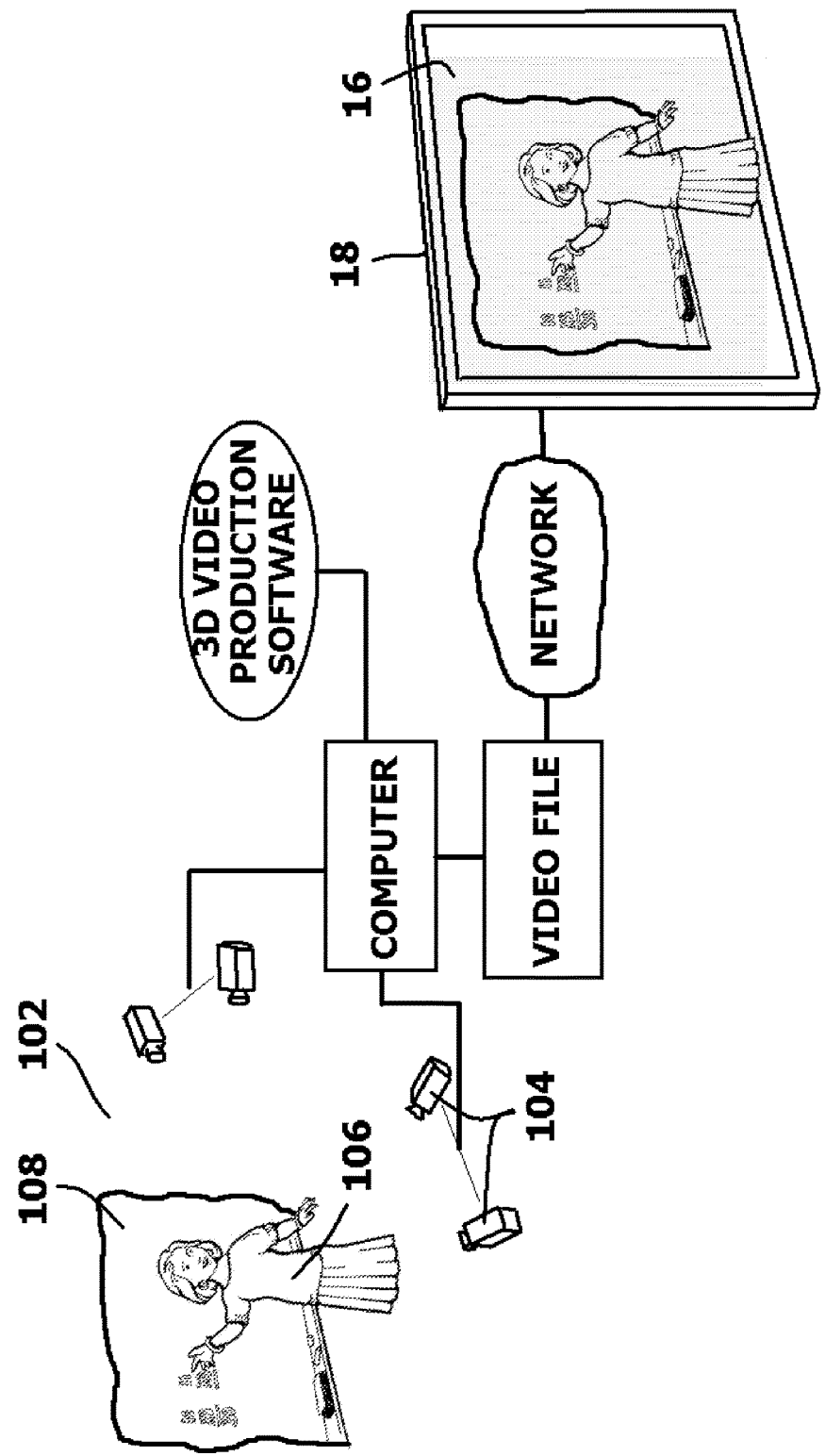
FIG. 14 shows an alternate exemplary application for the present invention system, method and software.

Referring to FIG. 14, a studio setting 102 is shown. The studio setting 102 has one of more sets of stereoscopic cameras 104 positioned to image a person or other real object within a known defined area. In the shown example, the person is a teacher 106 standing in front of a blackboard 108. In this scenario, the blackboard 108 can be selected as the reference plane. In this manner, the added 3D effects will cause the teacher 106 to appear to project in front of, or above, the blackboard 108 when viewed on the display screen 16 of an electronic device 18. Other uses include, but are not limited to, showing athletes performing sports, showing a dealer at a casino table, showing a receptionist in an office, showing a fashion model in any venue, or showing a lecturer in a lecture hall. The present invention system can be used in at kiosks in many venues, so that a single person at a remote location can interact live or in a pre-recorded format with customers at numerous locations. The present invention can also be used for customer service, wherein a customer service representative can appear live or in a pre-recorded format to answer questions and demonstrate solutions.

It will be understood that the embodiment of the present invention that is illustrated and described is merely exemplary and that a person skilled in the art can make many variations to that embodiment. The electronic device can be any device with a display, such as a smart phone, a tablet computer, or a dedicated kiosk display in a museum, hotel or waiting room. All such embodiments are intended to be included within the scope of the present invention as defined by the appended claims.

What is claimed is:

1. A method of producing a video file of a subject present within a physical scene, wherein said video file is to be viewed as a video on a display screen, said method comprising the steps of:

providing a first video camera and a second video camera proximate said physical scene;

positioning said first video camera and said second video camera to obtain stereoscopic footage of said subject within said physical scene, wherein said first video camera and said second video camera are both positioned to image said subject within peripheral boundaries of a common reference plane, and wherein said stereoscopic footage includes first video footage from said first video camera and second video footage from said second video camera;

altering said stereoscopic footage to add 3D effects that cause said subject to appear to extend above said common reference plane by digitally bending said stereoscopic footage in an area about said subject, wherein digitally bending said stereoscopic footage includes selecting a first bend point at a first elevation along said subject and bending stereoscopic footage corresponding to said subject above said first bend point;

superimposing said first video footage and said second video footage of said stereoscopic footage to create a superimposed video;

defining a common set of boundaries for said superimposed video to create said video file; and playing said video file on said display screen, wherein said subject appears to extend beyond said display screen.

2. The method according to claim 1, wherein said display screen has a screen plane and said video file is displayed with said common reference plane of said stereoscopic footage oriented in said screen plane.

3. The method according to claim 1, wherein altering said stereoscopic footage includes skewing selected areas of said stereoscopic footage.

4. The method according to claim 3, wherein skewing selected areas of said stereoscopic footage includes skewing an area surrounding said subject toward said first video camera and said second video camera.

5. The method according to claim 3, wherein skewing selected areas of said stereoscopic footage includes skewing said common reference plane relative said first video camera and said second video camera.

6. The method according to claim 1, wherein said subject has a perceived height above said common reference frame and said first elevation of said first bend point is between $1/3$ and $2/3$ of said perceived height.

7. The method according to claim 1, wherein digitally bending stereoscopic footage in an area about said subject includes selecting a second bend point at a second elevation along said subject, wherein said stereoscopic footage corresponding to said subject is bent by a first angle above said first bend point and by a second angle above said second bend point.

8. The method according to claim 7, wherein said second angle is greater than said first angle.

9. The method according to claim 1, including further altering said stereoscopic footage corresponding to said subject by tapering at least part of said stereoscopic footage corresponding to said subject.

10. The method according to claim 1, including further altering said stereoscopic footage corresponding to said subject by vertically elongating at least part of said stereoscopic footage corresponding to said subject.

11. The method according to claim 10, wherein said common set of boundaries includes a rear image boundary, wherein said on imaginary plane exists between said rear image boundary, said first video camera and said second video camera, wherein said stereoscopic footage corresponding to said subject is elongated toward and not beyond, said imaginary plane.

12. A method of producing 3D effects in a live video broadcast of a subject at a physical location, wherein said 3D effects are perceivable when said live video broadcast is viewed on a display screen, said method comprising the steps of:

providing a first video camera and a second video camera proximate said physical scene;

positioning said first video camera and said second video camera to obtain stereoscopic footage of said subject within said physical scene, wherein said first video camera and said second video camera are both positioned to image said subject within peripheral boundaries of a common reference plane, and wherein said first video camera and said second video camera are oriented to have a point of convergence on said reference plane;

digitally skewing said common reference plane of said stereoscopic footage to add said 3D effects, wherein digitally skewing said common reference plane includes digitally tilting said common reference plane at said point of convergence toward said first stereoscopic camera and said second stereoscopic camera;

superimposing said stereoscopic footage to create a superimposed video;

defining a common set of boundaries for said superimposed video to create a cropped stereoscopic video file; and broadcasting said cropped stereoscopic video file to be viewed on a display screen, wherein said subject appears to extend beyond said display screen.

13. The method according to claim 12, wherein said display screen has a screen plane and said cropped stereoscopic video file is displayed with said common reference plane of said stereoscopic footage oriented in said screen plane.

14. The method according to claim 12, further including skewing an area surrounding said subject toward said first video camera and said second video camera.

15. The method according to claim 12, further including altering said stereoscopic footage by digitally bending said stereoscopic footage in an area about said subject.

16. The method according to claim 15, wherein digitally bending stereoscopic footage in said area about said subject includes selecting a first bend point at a first elevation along said subject and bending stereoscopic footage corresponding to said subject above said first bend point.

17. The method according to claim 12, further including altering said stereoscopic footage corresponding to said subject by tapering at least part of said stereoscopic footage corresponding to said subject.

18. The method according to claim 12, further including altering said stereoscopic footage corresponding to said subject by vertically elongating at least part of said stereoscopic footage corresponding to said subject.

19. A method of producing 3D effects in a video presentation of a live scene, said method comprising the steps of:

positioning a first video camera and a second video camera proximate said live scene;

orienting said first video camera and said second video camera to obtain stereoscopic footage of said subject within said live scene, wherein said first video camera and said second video camera are both positioned to image said live scene within peripheral boundaries of a common reference plane;

digitally tapering at least a portion of said stereoscopic footage to add said 3D effects, wherein digitally tapering includes decreasing said subject within said stereoscopic footage as a function of elevation above said reference plane;

superimposing said stereoscopic footage to create a superimposed video;

defining a common set of boundaries for said superimposed video to create a cropped stereoscopic video file; and broadcasting said cropped stereoscopic video file to be viewed on a display screen, wherein said subject appears to extend beyond said display screen.

20. The method according to claim 19, wherein said display screen has a screen plane and said video file is displayed with said common reference plane of said stereoscopic footage oriented in said screen plane.

* * * * *